United States Patent
Pezzaniti et al.

(10) Patent No.: US 9,829,384 B2
(45) Date of Patent: Nov. 28, 2017

(54) LONG WAVE INFRARED IMAGING POLARIMETER, AND METHOD OF ASSEMBLY

(71) Applicant: POLARIS SENSOR TECHNOLOGIES, INC., Huntsville, AL (US)

(72) Inventors: J Larry Pezzaniti, Harvest, AL (US); Justin Parker Vaden, Madison, AL (US); Michael Ernest Roche, Huntsville, AL (US)

(73) Assignee: Polaris Sensor Technologies, Inc., Huntsville, AL (US)

( * ) Notice: Subject to any disclaimer, the term of this patent is extended or adjusted under 35 U.S.C. 154(b) by 0 days.

(21) Appl. No.: 14/854,326

(22) Filed: Sep. 15, 2015

(65) Prior Publication Data

US 2016/0003677 A1 Jan. 7, 2016

Related U.S. Application Data

(63) Continuation of application No. 14/776,837, filed as application No. PCT/US2014/030618 on Mar. 17, 2014.

(60) Provisional application No. 61/791,809, filed on Mar. 15, 2013.

(51) Int. Cl.
| | |
|---|---|
| *G01J 5/58* | (2006.01) |
| *G02B 5/30* | (2006.01) |
| *G01J 4/04* | (2006.01) |
| *G01J 5/10* | (2006.01) |
| *G01J 5/00* | (2006.01) |

(Continued)

(52) U.S. Cl.
CPC . *G01J 5/58* (2013.01); *G01J 4/04* (2013.01); *G01J 5/10* (2013.01); *G02B 5/3058* (2013.01); *G01J 2004/001* (2013.01); *G01J 2005/0077* (2013.01); *G01J 2005/586* (2013.01); *H04N 5/33* (2013.01)

(58) Field of Classification Search
CPC .................. G01J 4/04; G01J 2004/001; G01J 2005/0077; G01J 2005/586; G01J 5/10; G01J 5/58; G02B 5/3058; H04N 5/33
USPC ...................... 250/330, 225, 338.1
See application file for complete search history.

(56) References Cited

U.S. PATENT DOCUMENTS

| | | | | |
|---|---|---|---|---|
| 4,580,900 A | * | 4/1986 | Larsen | G03F 9/7069 356/400 |
| 4,615,621 A | * | 10/1986 | Allen | G03F 9/7069 356/399 |

(Continued)

OTHER PUBLICATIONS

Bowers, D.L. et al., "Unpolarized calibration and nonuniformity correction for long-wave infrared microgrid imaging polarimeters", 2008, Optical Engineering 47(4), pp. 046403-1 to 046403-9.*

(Continued)

*Primary Examiner* — David Porta
*Assistant Examiner* — Blake Riddick
(74) *Attorney, Agent, or Firm* — Joseph S. Bird, III; Bradley Arant Boult Cummings LLP

(57) ABSTRACT

A long wave infrared imaging polarimeter (LWIP) is disclosed including a pixilated polarizing array (PPA) in close proximity to a microbolometer focal plane array (MFPA), along with an alignment engine for aligning and bonding the PPA and MFPA and method for assembly.

35 Claims, 18 Drawing Sheets

(51) Int. Cl.
  *H04N 5/33* (2006.01)
  *G01J 4/00* (2006.01)

(56) References Cited

U.S. PATENT DOCUMENTS

| | | | | |
|---|---|---|---|---|
| 5,045,701 A * | 9/1991 | Goldstein | ............... | G01J 3/447 250/339.07 |
| 5,337,146 A * | 8/1994 | Azzam | ............... | G01J 3/189 250/225 |
| 5,481,332 A * | 1/1996 | Shiraishi | ............ | G03F 7/70058 355/53 |
| 5,890,095 A * | 3/1999 | Barbour | ............... | G01J 5/58 250/341.3 |
| 5,952,132 A * | 9/1999 | King | ............... | G03F 7/70633 430/22 |
| 5,996,376 A * | 12/1999 | Johnson | ............... | G02B 6/241 65/406 |
| 6,262,418 B1 * | 7/2001 | Hashimoto | ............... | G01J 5/34 250/338.3 |
| 6,459,084 B1 * | 10/2002 | Boreman | ............... | G01J 5/08 250/338.4 |
| 6,512,627 B1 * | 1/2003 | Kim | ............... | G01J 9/00 356/477 |
| 6,583,416 B1 * | 6/2003 | Villani | ............... | G01J 5/06 250/332 |
| 6,690,014 B1 * | 2/2004 | Gooch | ............... | G01J 5/20 250/338.4 |
| 6,762,713 B1 * | 7/2004 | McMillan | ............... | G01S 7/024 342/188 |
| 6,777,681 B1 * | 8/2004 | Schimert | ............... | G01J 5/20 250/330 |
| 8,238,026 B1 * | 8/2012 | Kemme | ............... | G01J 4/04 250/225 |
| 2003/0220749 A1 * | 11/2003 | Chen | ............... | A61B 5/0066 702/31 |
| 2004/0021254 A1 * | 2/2004 | Sreenivasan | ............... | B29C 35/0888 264/406 |
| 2006/0270179 A1 * | 11/2006 | Yang | ............... | B81C 3/002 438/401 |
| 2007/0170359 A1 * | 7/2007 | Syllaios | ............... | G01J 3/02 250/338.1 |
| 2007/0241267 A1 * | 10/2007 | Gruev | ............... | G01J 4/04 250/225 |
| 2010/0265467 A1 * | 10/2010 | Lescure | ............... | G02B 27/1033 353/20 |
| 2011/0058038 A1 * | 3/2011 | Twede | ............... | H04N 5/332 348/148 |
| 2011/0266443 A1 * | 11/2011 | Schimert | ............... | G01J 1/02 250/338.4 |
| 2012/0075513 A1 * | 3/2012 | Chipman | ............... | G01J 4/04 348/302 |
| 2013/0153767 A1 * | 6/2013 | Savoy | ............... | G01J 1/0429 250/338.1 |

OTHER PUBLICATIONS

Hardie, R.C. et al., "Joint MAP Registration and High-Resolution Image Estimation Using a Sequence of Undersampled Images", 1997, IEEE Transactions on Image Processing 6(12), pp. 1621-1633.*

Ratliff, B.M. et al., "Interpolation strategies for reducing IFOV artifacts in microgrid polarimeter imagery", 2009, Optics Express 17(11), pp. 9112-9125.*

Tyo, J.S. et al., "Review of passive imaging polarimetry for remote sensing applications", 2006, Applied Optics 45(22), pp. 5453-5469.*

Tyo, J.S. et al., "Total elimination of sampling errors in polarization imagery obtained with integrated microgrid polarimeters", 2009, Optics Letters 34(20), pp. 3187-3189.*

* cited by examiner

LONG WAVE INFRARED IMAGING POLARIMETER, AND METHOD OF ASSEMBLY

STATEMENT CONCERNING PRIORITY

This application is a continuation of, and claims the benefit and priority to, U.S. patent application Ser. No. 14/776,837 filed Sep. 15, 2015, which is a continuation of, and claims the benefit of and priority to, international application PCT/US2014/030618, filed Mar. 17, 2014. International application no. PCT/US2014/030618 claims the benefit of and priority to U.S. Provisional Patent Application 61/791,809 filed on Mar. 15, 2013, which is incorporated herein in its entirety.

INTRODUCTION

As used herein, Long Wave Infrared is referred to as "LWIR." A Long Wave Infrared Imaging Polarimeter (herein "LWIP") is disclosed herein, and a method of assembly. In one embodiment, a patterned pixelated polarizer array 1 (herein "PPA") is provided in close proximity to the focal plane array of a microbolometer 3 (herein "MFPA") in a camera.

DESCRIPTION

Figure 1:
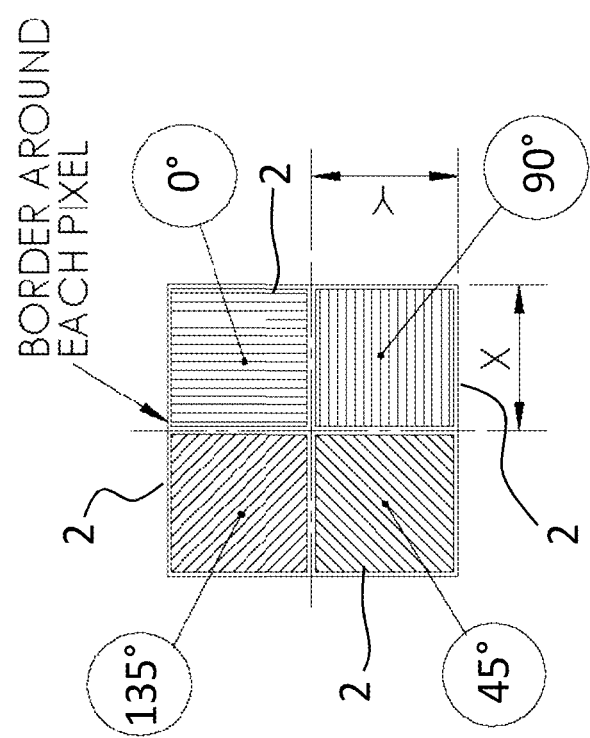
FIG. 1 shows a magnified image of four pixels of a wire grid type PPA.

An LWIP is disclosed herein comprising a PPA comprising pixels which are aligned to and brought into close proximity to the pixels of an MFPA, such that interlaced images of different polarization states are collected in a single image and used to compute thermal and polarized images of the scene.

Thermal infrared imagers such as microbolometer cameras operating in LWIR function in both day-time and night-time (total darkness) conditions. Still, thermal imaging cameras often fall short in situations involving high clutter and low thermal contrast. The LWIP camera disclosed herein measures both thermal and polarization content of an image and is especially effective when thermal contrast is low or when the target becomes hidden in the background.

During a thermal cross-over period, when the target apparent temperature matches the background apparent temperature, the contrast between the target and background becomes zero (the target completely blends into the background and disappears from the image). However, the polarization state emanating from the target is often different than that of the background. Therefore, even when thermal contrast is low or zero, polarization contrast is often still present. The LWIP measures both the thermal and polarization content of a scene. The user may select thermal only, polarization only or hybrid thermal overlaid with polarization.

Another advantage of LWIP is background clutter rejection. The unpolarized thermal image can be difficult to interpret because of its monochromatic nature and the complexity of natural background in the scene. For example trying to locate a man-made object in natural clutter is difficult because many natural features (such as trees, shrubs, large boulders, and bald spots) can take on the apparent size and temperature of the target of interest. However in most situations, the man-made target of interest is visible in the polarization image, whereas the natural features are not visible. The reason is because natural clutter (trees, shrubs, grass, rock, etc) typically has a rough surface and randomizes the polarization state of light in scattering processes, whereas man-made objects, which are much smoother, tend to preserve polarization as the scattering process is much less. Therefore man-made objects appear partially polarized in the scene and natural clutter tends to be unpolarized. This level of discrimination from the sensor itself greatly enhances the robustness of target acquisition, tracking and discrimination algorithms used in a wide range of applications.

Thermal and polarization signatures depend on the temperature, material and surface roughness of the target and background, the down-welling radiance, earth albedo, aspect angle, path radiance and several other parameters. Because the physics governing the thermal signature and polarization signatures are different, the object of interest is most often found in a least one of either the thermal or polarization image. It is important to note that the LWIP provides both a thermal and a polarization image. The LWIP provides a thermal only image, a polarization only image or a hybrid thermal/polarization image.

The LWIP described herein is realized by positioning a PPA a close distance from an MFPA.

FIG. 1 shows an arrangement of the polarization elements in a single unit cell of the PPA. This unit cell is repeated across the entire array of the PPA 1.

A desirable structure for the PPA 1 is the wire grid type polarizer because, among other reasons, it has a wide angular acceptance cone and operates over a wide spectral bandwidth. The wide acceptance cone is important because the polarizer is positioned at the focal plane of the image the light is coming to focus. Since the microbolometer must operate near f/1 (f-number), the ray cone has approximately a 30 degree half angle. The transmission properties and polarization rejection of the wire grid polarizer is optimal up to angles exceeding 30 degrees. Another advantage of the wire grid polarizer is that it can operate over wide spectral bandwidths. A LWIR microbolometer operates over a spectral range of 7.5-13.5 microns. This also is well within the capabilities of a wire grid polarizer design.

The wire grid polarizer also has a manufacturing advantage. First, the wire grid polarizer can be deposited directly on a flat substrate or on a flat substrate that has an Anti-Reflection ("AR") coating deposited on its surface. Substrates that can be used must transmit in the infrared. Examples of substrates that can be used include Zinc Selenide (ZnSe), Zinc Sulfide (ZnS), Silicon (Si), Germanium (Ge). The wires are deposited on the virgin substrate or AR coated substrate using standard lithographic and etching processes. A PPA manufactured on flat substrates such as these can be very flat and vacuum compatible. Flatness is important so that spacing between the PPA pixels 2 and MFPA pixels 4 can be maintained across the entire array to within a few microns.

Vacuum compatibility is important because the PPA cannot outgas into the vacuum package of the MFPA. The wires, substrate, and AR coating can all be selected to withstand high temperature and to be compatible with high temperature bake-out procedures to eliminate outgassing.

The invention herein is broad enough to comprise, in lieu of the wire grid type polarizer, any other type polarizer having microcomponents which preferentially absorb energy in one state and transmit the energy in a second state. Such polarizers could include any set of microstructures created by polymers or other nanomaterials.

In FIG. 1, which is an embodiment of the PPA 1 as a wire grid type polarizer, each PPA pixel 2 in the 2×2 array has a polarizer with its transmission axis oriented at a particular angle, preferably 0, 45, 90 and 135 degrees, as they are labeled on FIG. 1. The pitch of the pixels 2 in FIG. 1 are represented as X and Y which are, in one embodiment, 17 microns×17 microns square. The polarization transmission axis is orthogonal to the long axis of the wires. Radiation that is polarized with its electric field parallel to the plane parallel to the wires is absorbed and radiation polarized perpendicular to the wires is transmitted. The efficiency of the polarizer is defined as how efficiently it transmits the desired polarization state and the extent to which it extinguishes the undesired (orthogonal) polarization state. Several parameters of the wire grid polarizer determine the efficiency of the polarizer. These parameters include the period of the wire grid (spacing between neighboring wires), the duty cycle of the wire grid (ratio of wire width to spacing between wires), the thickness of the wires, the material of the wire, the substrate refractive index, the prescription of the AR coating upon which the wires are deposited. Note that unless the wires are deposited on a very low refractive index substrate, it is important that the substrate be AR coated to maximize transmission of the desired polarization state. Also the wires can be deposited on top of the AR coating or in any of the layers of the AR coating. The optimal choice for which layer to deposit the wires depends on the waveband (wavelength) of operation the range of angles of incidence that the polarizer must operate, the substrate that is used for the polarizer and the properties of the wire grid (pitch, duty cycle, wire material, wire thickness). The pitch of the PPA is chosen to exactly match the pitch of the MFPA. The wire grid polarizer can designed using Rigorous Coupled Wave Analysis (RCWA) code (such as G-solver commercial RCWA code), or Finite Element Methods (such as Ansoft HFSS modeling code). This latter software utilizes the finite-element-method (FEM) to solve the electromagnetic fields that propagate through and scatter from the wire grid polarizer elements.

The design space for the wire grid polarizer is vast. However, the software needed for designing these structures is mature, robust and reliable. A set of parameters for this design are given in Table 1.

TABLE 1

Wire Grid Polarizer Design Parameters

| Parameter | Value |
| --- | --- |
| Wire Grid Period | 1 micron |
| Duty Cycle | 50% |
| Wire Material | Gold |
| Wire thickness | 90 nm |
| AR coating | Standard BBAR AR coating |
| Wire Overcoat | ZnSe |

The above parameters relate to existing technology but are not exclusive and can be altered especially as the technical specifications of the components change and evolve.

Figure 2:
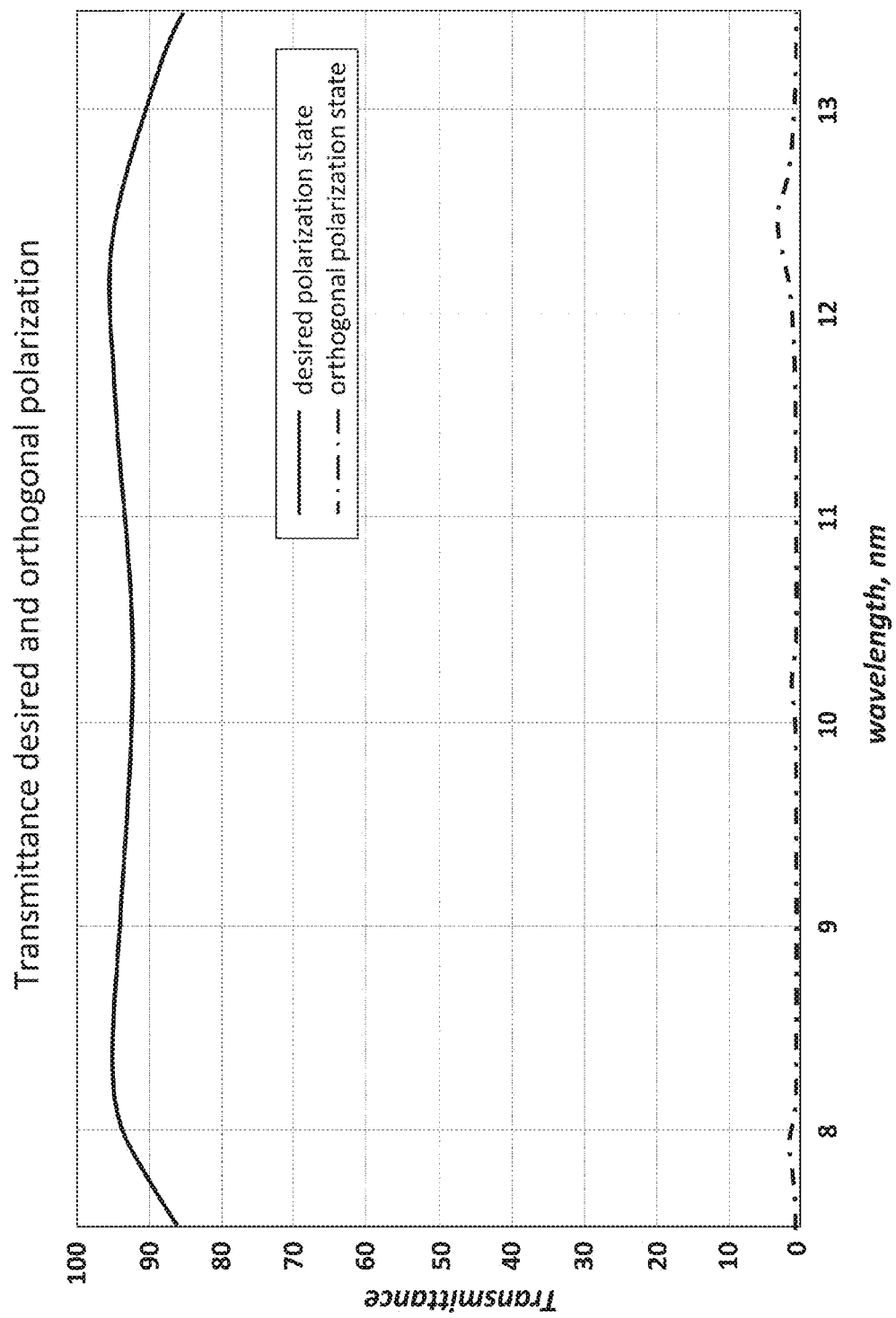
FIG. 2 shows a typical efficiency of a polarizer as a function of wavelength.

In FIG. 2, the efficiency of a 17 micron square pixel is shown. The dark curve shows the percent transmittance of the desired polarization state and the dashed line shows the transmittance of the orthogonal, undesired polarization state.

Figure 3:
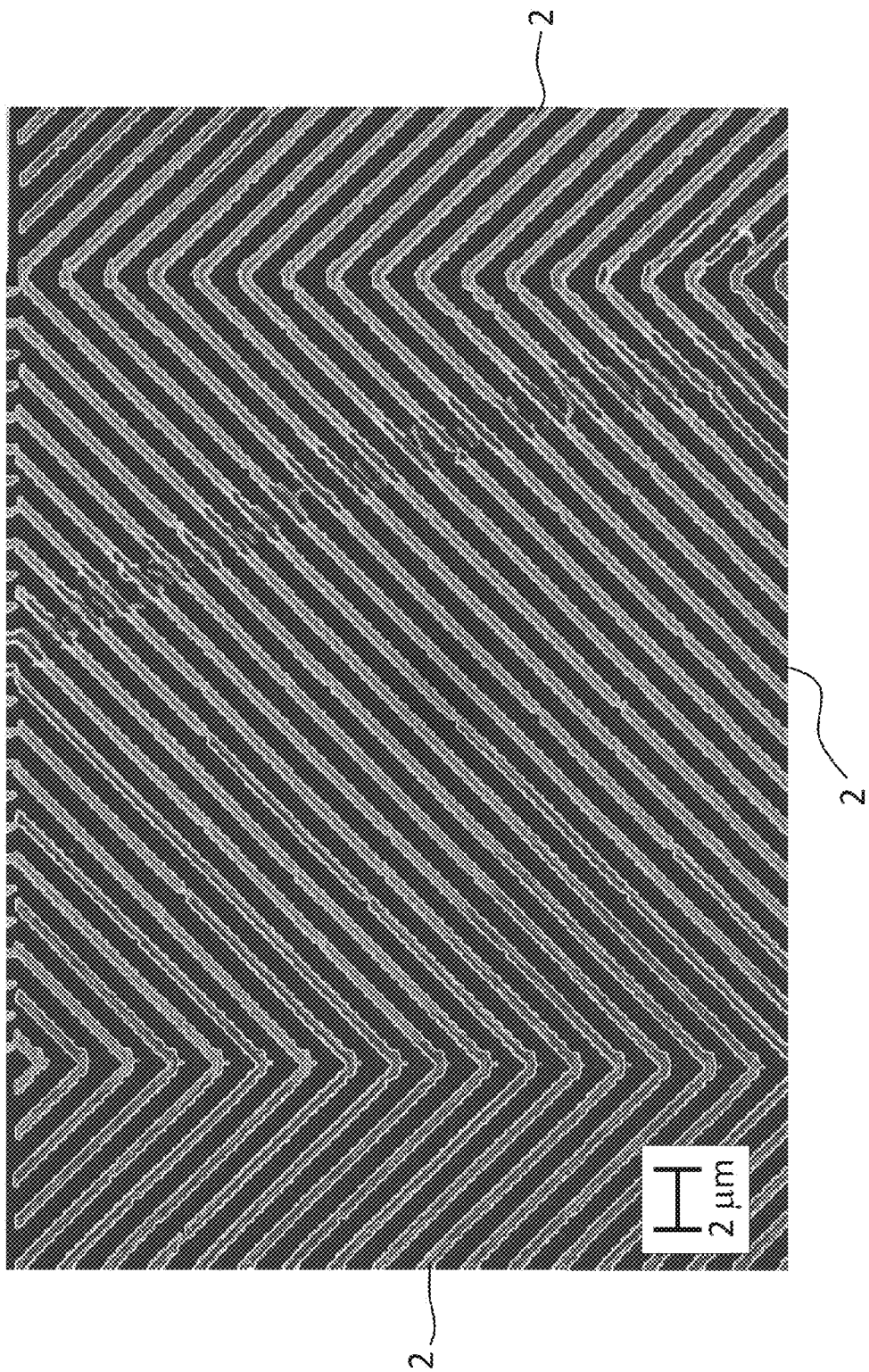
FIG. 3 shows a high magnification SEM image of a wire grid type pixel.

A High Magnification SEM image of a wire grid structure of the 45 degree and 135 degree PPA pixels is shown in FIG. 3.

Figure 4:
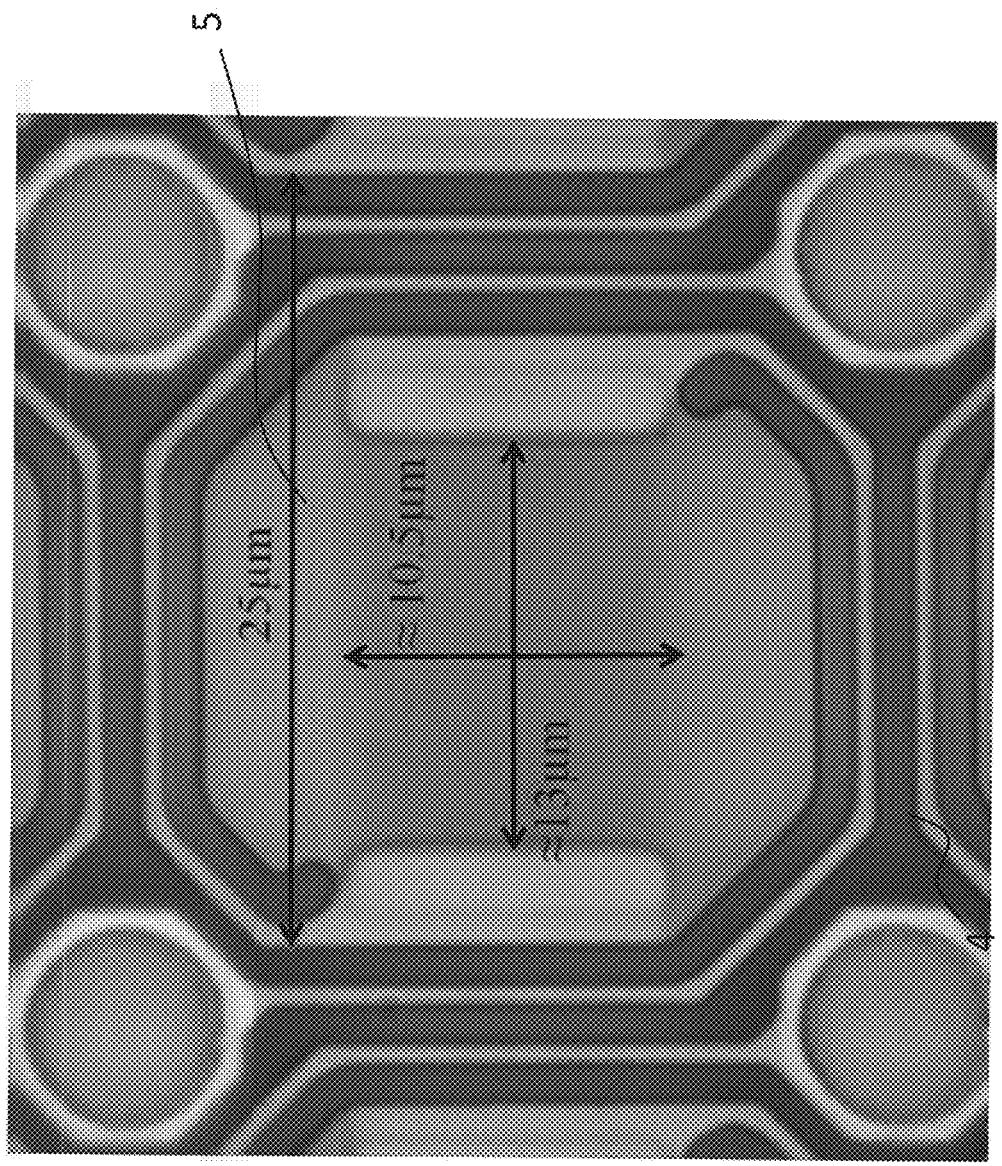
FIG. 4 a high magnification image of an individual wire grid type pixel.

In FIG. 4, the active area 5 of the MFPA pixel 4 is, in one embodiment, depicted as the more darkly shaded 13×10.5 micron region in the center of the pixel. In one embodiment, the active area of the MFPA pixel is about 23% of the pixel area.

Because of the large ray angles (low f/number or f/#) of energy entering the invention, the PPA 1 must be placed in close proximity to the MFPA 3. If the PPA is too far from the MFPA, cross-talk will occur between the pixels. That is, light energy that passes through a horizontal pixel will impinge on a vertically polarized neighboring pixel. This would reduce the performance of the system because the light spilling into the neighboring pixel would be spuriously interpreted as vertically polarized light from the scene. This can be compensated for in calibration, but limits the ultimate performance of the system. Using existing components, a suitable distance from the PPA to the MFPA does not exceed half of the pixel pitch. For example, if the pixel pitch of the PPA and MFPA is 17 microns, then the distance between them should not exceed approximately 8.5 microns. The center of the PPA pixel is preferably within +/−2 microns of the center of the MFPA pixel active area.

The method disclosed herein allows location of the position of a PPA between an energy source and an MFPA within a close tolerance and accuracy by employing several means including, without limitation, a Long Working Distance Microscope with an associated camera 6A (herein "LWD microscope and camera").

Because of the high vacuum requirements of an MFPA package, methods for attaching the PPA to the MFPA are limited. For example, epoxies may be used, but must have extremely low outgassing properties. Furthermore, once the low outgas epoxy is cured, a vacuum bake-out procedure must be applied to eliminate volatiles from the epoxy matrix. The number of low outgas epoxies are limited. Suitable epoxies include Armstrong A-12 Epoxy resin adhesive (manufactured by Armstrong Epoxy Adhesives, Easton, Mass.), Epo-Tek OG198-55 (manufactured by Epoxy Technology, Billerica, Mass.), and Epo-Tek 353ND-T.

The epoxies have different Total Mass Loss (TML), Collected Volatile Condensable Material (CVCM), pot-life, curing method, viscosity, Glass Transmission Temperature, thermal conductivity, and many other parameters that can be vitally important to a particular use. Important qualities for the epoxy described herein are low outgassing, good bond strength, and resistance to the thermal profile in the assembly process, qualities which do not necessarily correspond to low viscosity and fast curing properties that are ideal for the assembly process. For this reason an assembly process that can be used for a variety of viscosities and curing procedures is essential in order the select an epoxy with the best required specifications.

To maintain the desired distance between the PPA pixels and the MFPA pixels, microspheres may be added to the epoxy in low concentration.

Alternatively, a bond pedestal 7 that is fabricated onto the surface of the PPA can be constructed. In a preferred embodiment, the pedestal is deposited onto the PPA in locations that will not interfere with the operation of the MFPA when the PPA is attached. The pedestal location can be controlled with shadow mask lithography techniques wherein a mask is laid over the PPA and an AR coating material that has good adhesion to the substrate or the substrates AR coating is deposited through the openings of the mask. This is a standard method employed by AR coating laboratories. AR coating materials are suggested for the pedestal because (1) the AR coating laboratories have processes and tools to deposit them, (2) the AR coating materials have been selected for good adhesion, (3) the deposition tools are calibrated for controlling thickness of the depositions accurately, and (4) in the LWIR portion of the spectra, these coatings are typically deposited thick— they can easily be used to produce pedestals that are several microns tall.

Another method for fabricating the pedestals is to use photo-lithography to pattern the pedestals in a thick photo resist. The thickness of the photo resist can be precisely controlled and standard lithographic lift-off techniques can be used to produce the pedestals. A recommended photo-resist is SU-8. This photo resist is commonly used to pattern very thick tens of microns tall features. The outgassing properties of the SU-8 must be reduced by applying standard high temperature vacuum bake-out procedures.

Fluxless solder is an attractive option for bonding because it will not outgas if it is pure. To control thickness, a thin solder such as Indium can be used and microspheres machined to the diameter of the desired thickness can be mechanically embedded in the solder. When the solder is reflowed, the solder thickness will reduce to the thickness of the micro-spheres—the separation will be controlled when both the MFPA and the PPA come in contact with the spheres.

The distance between the PPA pixels and MFPA pixels can also be controlled by the vision system described herein. This method is described below after the alignment hardware and procedures are described.

A polarization image is determined by comparing the intensity values of the orthogonal polarization states. The standard method of computing a polarization image is through use of the Stokes calculus wherein a pair of Stokes images ($S_1$ and $S_2$) are computed from the following equations $$S_1 = \frac{I_0 - I_{90}}{I_{90} + I_0}$$

$$S_2 = \frac{I_{45} - I_{135}}{I_{45} + I_{135}}$$

where $I_0$ is the image formed with the 0 degree or horizontally polarized pixels, $I_{90}$ is the image formed with the 90 degree or vertically polarized pixels, $I_{45}$ is the image formed with the 45 degree polarized pixels, and $I_{135}$ is the image formed with the 135 degree polarized pixels.

Standard methods for interpolating between adjacent pixels and computing these polarization images from raw uncorrected interlaced polarized images are in the literature and are incorporated herein through reference: J. S. Tyo, C. F. LaCasse, and B. M. Ratliff, "Total elimination of sampling errors in polarization imagery obtained with integrated microgrid polarimeters," Opt. Lett. 34:3187-3189 (2009); R. C. Hardie, K. J. Barnard, and E. E. Armstrong, "Joint MAP registration and high resolution image estimation using a sequence of undersampled images," IEEE Trans. on Image Proc. 6, pp. 1621-1633 (1997).

To align the PPA to the MFPA, a standard flip chip bonder may be used as an alternate means. The flip chip bonder views the underside of the PPA and the top of the focal plane array to align the pixels or fiducial marks. Once the two planes are aligned, the vision system is moved out of the way and the parts are brought into contact and bonded together. A flip chip bonder is well known in the art.

A preferred method for aligning and bonding the PPA to the MFPA is described next. With this method a transparent substrate may be used for the PPA. If this is used, then a vision system can look through the PPA at the underlying focal plane array. When the PPA and MFPA are brought within 25 microns of one another, then both the polarizer array and MFPA are in sufficient focus in the vision system for the purpose of alignment of the PPA pixels to the corresponding MFPA pixels. Adjustments can be made to the polarizer array until they are perfectly aligned and then the two planes can be brought together and bonded.

Figure 5:
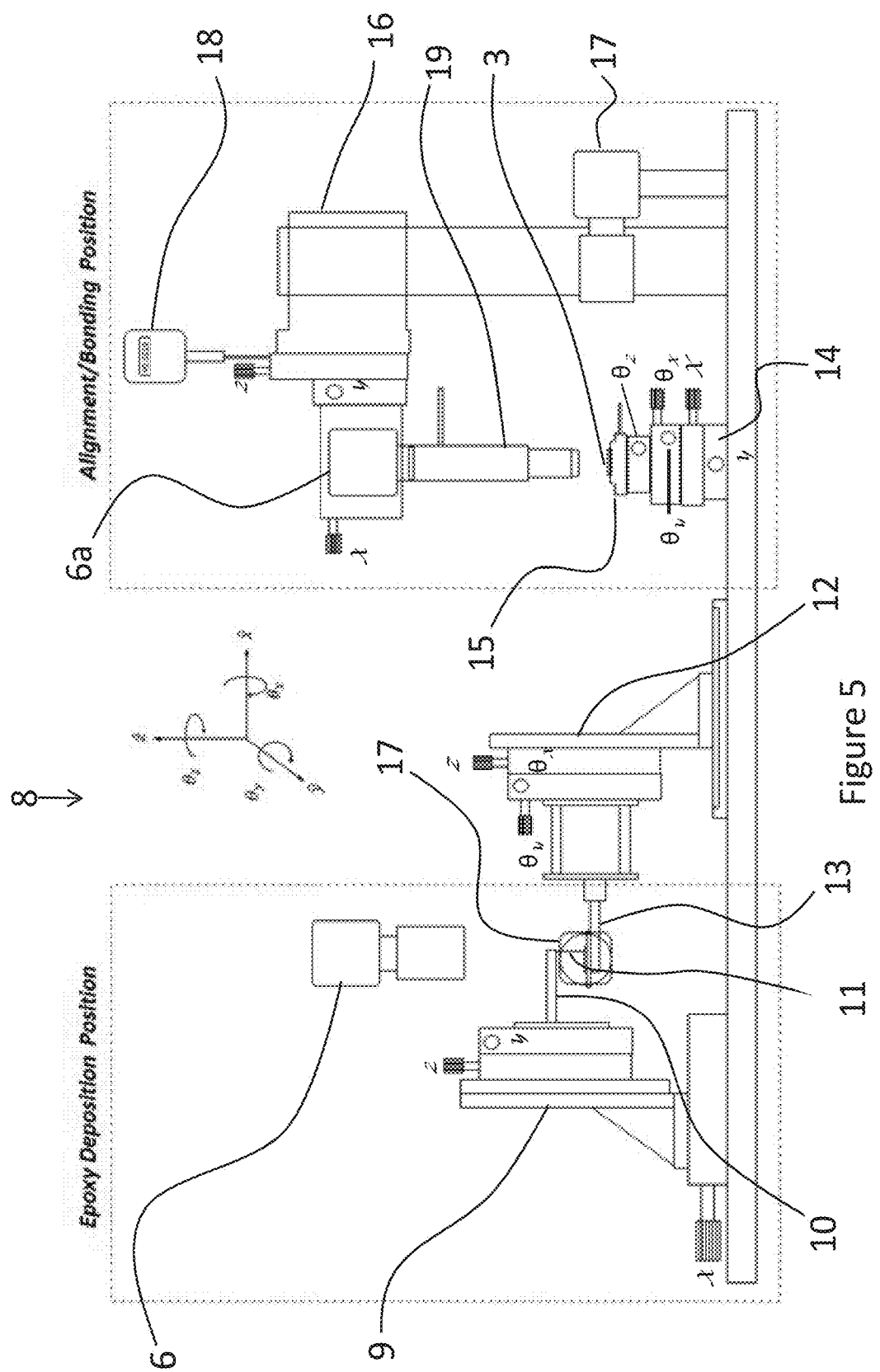
FIG. 5 is a side view of the Alignment Engine in the Epoxy Deposition Position.
Figure 6:
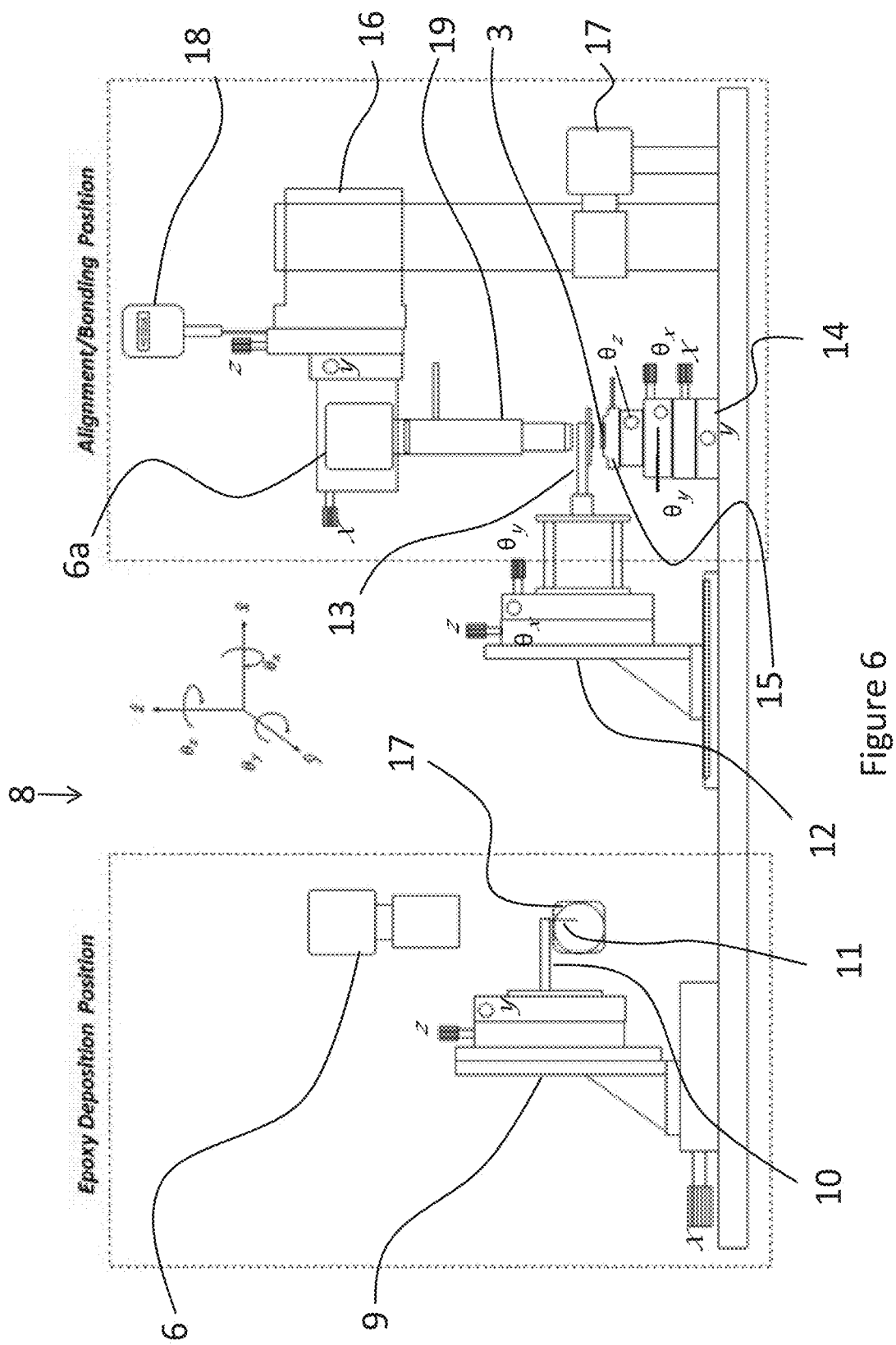
FIG. 6 is a side view of the Alignment Engine in the Alignment and Bonding Position.

FIGS. 5 and 6 show an Alignment Engine 8 used for applying epoxy and aligning and bonding the PPA with the MFPA. The Alignment Engine 8 comprises an Epoxy Deposition Stage 9, a needle mount 10, a needle 11, a downlooking camera 6 and a first sidelooking camera 17; a PPA chuck actuator 12 and PPA chuck 13; an MFPA chuck actuator 14 and MFPA chuck 15; LWD microscope and camera 6a, an LWD actuator 16, a second sidelooking camera 17a, and a depth gauge 18.

The Alignment Engine's functions include, without limitation, applying small amounts of epoxy to the PPA, aligning the pixels of the PPA to the pixels of the MFPA, positioning the PPA parallel to and a controlled distance above the MFPA, and snap curing the epoxy to fix the PPA in place. The degrees of freedom required for the adjustments described here are provided in FIGS. 5 and 6 and reference the coordinate system shown in the center of the drawings.

The Alignment Engine has two positions. The first position on the left of FIGS. 5 and 6 is the Epoxy Deposition Position in the dotted line box on the left side of each sheet, the position in which epoxy is deposited on the PPA. The second position is the Alignment and Bonding Position in the dotted line box on the right side of FIGS. 5 and 6 where occurs alignment of the PPA pixels one-to-one correspondence with the MFPA pixels, and positioning the planar portions of the PPA and of the MFPA parallel to one another at a controlled distance from one another.

FIG. 5 shows the PPA positioned on the PPA chuck 13 for epoxy deposition. A small <10 nL of epoxy is deposited on several locations of the contact side of the PPA. The locations of the epoxy deposition depend on the "keep outs" of the MFPA, where epoxy cannot touch either the PPA or the MFPA surfaces. The Epoxy Deposition Stage 9 is a 3-axis stage is used to translate in X or Y or move vertically in Z the needle mount 10 which has near its end, in one embodiment, a needle 11. In an embodiment controlled by a user, the user watches the Epoxy Deposition Station in the downlooking camera 6 and the first sidelooking camera 17 while the needle 11 applies epoxy drops onto the PPA surface. This process can be automated to deposit the epoxy quickly with commercially available vision/robotic technology.

The PPA chuck actuator 11 a PPA chuck 13 which is vacuum enabled for holding the PPA, and also a motor for moving the PPA chuck in the x and y axis to the Alignment and Bonding Position, and also rotating it downward. When the PPA has received epoxy, the PPA chuck actuator translates the PPA chuck from the Epoxy Deposition Position to the Alignment and Bonding Position, and rotates it so that the PPA chuck 13 faces downward and is above the MFPA and can be lowered to the MFPA. The PPA chuck actuator 13 grips the PPA by means of a vacuum. FIG. 6 shows this configuration. The PPA chuck 13 holding the PPA comprises transparent glass in the line of sight of the LWD microscope and camera 6a which allow the user (or a vision system) to see through to the contact surface of the PPA and the top surface of the MFPA. Note that this works only when the PPA is transparent in the waveband of the LWD microscope and camera 6a.

The LWD microscope is selected to provide high magnification and small depth of focus. A 20×, 0.4 NA, Mitutoyo Objective lens works very well for this purpose. The LWD microscope is translated back and forth and focused on different positions of the PPA and the PPA is adjusted in tip/tilt in ($\theta_x$, $\theta_y$) until all parts of the PPA remain in focus as the LWD microscope is translated in x-y. This step is repeated with the MFPA so that the MFPA and PPA are substantially parallel to one another.

Once the PPA is substantially parallel to the MFPA, the PPA is lowered to the MFPA. The PPA is brought into close enough proximity to the MFPA so that the pixels and the alignment marks on the PPA and the MFPA are both in focus in the LWD microscope and camera 6a. Once in focus, the MFPA is translated in x-y-$\theta_z$ until the pixels of the PPA and MFPA are aligned across the entire active area of the MFPA.

Once the PPA is aligned and parallel to the MFPA, the PPA is lowered until it is at the desired distance from the MFPA. This can be controlled with the vision system or by other methods described above herein. Once the PPA is aligned with the MFPA and at the correct height, the position of the PPA can be frozen by irradiating the epoxy with UV light if a UV cure epoxy is used.

Table 2 shows the calculated depth of field for various microscope objective lenses. To achieve acceptable lateral resolution and have adequate working distance, a 10× or a 20× objective is used in one embodiment. The depth of focus is 8.5 µm for a 10× objective lens and 5.8 µm for a 20× objective. One could assume from these values, that a depth resolution relying on the depth of focus would not be useful. For example, relying on a +/−5.8 µm determination of the height of the PPA from one end to the other to determine level would not be sufficient. However, the best focus position can be determined with much better precision.

| Depth of Field and Image Depth | | |
| --- | --- | --- |
| Magnification | Numerical Aperture | Depth of Focus (µm) |
| 4× | 0.10 | 55.5 |
| 10× | 0.25 | 8.5 |
| 20× | 0.40 | 5.8 |
| 40× | 0.65 | 1.0 |
| 60× | 0.85 | 0.40 |
| 100× | 0.95 | 0.19 |

A location which is "best focus" in z can be determined to within +/−1 µm accuracy if the sharpness of the image is observed through focus. This amount of height resolution is sufficient to level the PPA to the MFPA.

The accuracy of the best focus is improved by careful choice of a fiducial mark on the PPA array. For example if an array of lines or a line pair is used, the contrast (bright to dark) of the image on the lines and between the lines can be compared. When the bright to dark contrast is a maximum, the PPA is in best focus. The best focus can be determined by eye, or the image of the fiducial mark can be digitized and the contrast can be calculated as the PPA passes through best focus. A "through focus contrast" can be fit to a quadratic equation and the derivative of the quadratic equation can be used to determine the best focus to sub-micron accuracy. Using this method the location of the height of the PPA above the MFPA can be determined to well within +/−1 micron accuracy. This is sufficient vertical resolution for leveling the PPA and setting the height of the PPA above the MFPA.

To level the PPA using best focus, the objective lens 19 of the LWD microscope is translated to one end of the PPA and the camera associated with the LWD microscope is adjusted in z until best focus is observed. The latter camera is translated to at least 2 other positions separated in a triangular pattern and this step is repeated. The amount of tip/tilt required to level the PPA is calculated based on the distance the camera is translated and the amount of z translation required to achieve best focus at those points. The more points are evaluated, the more accurate the required tip/tilt can be calculated. The tip/tilt is applied and the above process can be repeated to ensure that the applied tip/tilt leveled the PPA to the desired accuracy.

Best focus techniques described above can also be used to control the bond line thickness. In this step the objective lens 19 is first focused on the MFPA. Next the objective lens 19 is translated in z to the desired bond line thickness. Finally, the PPA (after it is leveled) is translated to the position of best focus. If the epoxy squeezes out properly, the bond line thickness will be uniform across the part. This can be verified by translating the objective lens 19 across the PPA to verify leveling of the part has not changed.

Alternatively, the bond-line thickness is controlled by using pedestals or glass bead spacers as described above herein.

UV snap cure epoxies that include a shadow thermal full cure are ideal for attaching the PPA to the MFPA. Once the PPA is aligned to the MFPA and leveled, UV light can be used to do a fast snap cure. The bond need not be fully cured, only strong enough that the PPA chuck 13 and MFPA chuck 15 can be released and the MFPA and PPA can be transferred to an oven for full cure.

Depositing small amounts of epoxy in a controlled fashion is critical to ensure that the epoxy remains in the bonding areas attaching the PPA to MFPA and out of the keep-out regions. One way to prevent epoxy from wicking into keep-out areas is to limit the volume in the drop deposited on the surface. The spatial extent of the bond area cannot exceed the volume defined by the bond-line thickness times the surface area of the bond. In order to control the amount of epoxy deposited in a drop, the needle 11 (in one embodiment, a thin acupuncture needle) can be used to dip into a well of epoxy then touched to the surface of the PPA. The size of the drop on the needle 11 is determined by its diameter, sharpness of the tip and the depth that the needle is dipped into the epoxy well. The amount of the drop that clings to the needle 11 that is deposited on the PPA surface depends on the distance between the needle 11 and the PPA surface and the dwell time that the needle contacts the PPA surface. All of these parameters can be controlled with an automated system. The parameters are adjusted until the amount of desired epoxy is reliably deposited on the PPA surface.

Other probes can be used besides an acupuncture needle. However, acupuncture needles work very well because they are sterile, thin, and long and come in many different diameters.

Wetting agents can also be applied to the needle in order to cause different amounts of epoxy to cling to the needle and to cause the center of the droplet to be closer or further away from the PPA.

Standard process development can be applied to arrive at a solution that provides small repeatable amounts of epoxy drops on the PPA surface.

Epoxy can also be deposited on the PPA with a commercial epoxy dispenser such as Jetting Dispenser. These epoxy dispensers work best if the viscosity is below 200 cPs—or the consistency of warm honey. AN example of a commercially available Jetting Dispenser is the PDJ-1000 manufactured by Advanjet, Santa Fe, Calif. The PDJ-1000 dispenses liquids with viscosities up to 1000 cPs to in as small as 5 nL volumes. Epoxy volume required to attach the PPA corresponds to a ~1 mm diameter bond area that with an 8 microns thick bond line is approximately 6 nL. Other manufacturers of nana-liter epoxy delivery systems include Nordson EFD (www.nordson.com), and IVEK corporation (www.ivek.com).

Jetting technology or use of a needle or other probe can also be used to deposit epoxies in which microspheres added to control the bond-line thickness. For this to be successful, the microspheres must be well mixed into the epoxy. Mixing the microspheres into a high viscosity epoxy is much more difficult than mixing them into low viscosity epoxy. However, microspheres can be mixed into both high viscosity and low viscosity epoxies using a Turrax Homogenizer, offered by Sigma Aldrich, Inc. (www.sigmaaldrich.com). Many other vendors offer homogenizers as well.

Beads may also be dried onto the surface of PPA or MFPA. The beads are first mixed into ethanol and a small drop is metered onto the substrate (using the PDJ-1000). Suitable beads, for example, are 1.2 µm diameter SiO2 microsphere manufactured by Microspheres-NanoSpheres, Inc (www.microspheres-nanospheres.com) dried onto a glass substrate. The diameter uniformity of the spheres is +/−5% (3σ), or +/−60 nm for a 1.2 µm diameter sphere. The spheres form a mono-layer even though they are closely packed. If aggregates of the spheres form, the spacing provided by the spheres could be significantly different than the sphere diameter. Preventing aggregates of the spheres is very important to achieving an accurate thickness in the bond-line. To prevent aggregates, three parameters must be controlled: (1) the concentration of beads in the ethanol, (2) drying time, and (3) pressure needed to squeeze out the spheres into a monolayer. If the first two parameters are determined well with process development, then the beads will naturally form a mono-layer and pressure to squeeze out the spheres is not necessary. For the process herein, the spheres would be dried onto the PPA.

Once the beads are deposited and dried onto the PPA, the PPA can be bonded to the FPA with epoxy. The epoxy would be deposited onto the FPA using the PDF-1000 and the PPA is attached to the MFPA with a small amount to squeeze out the epoxy and force the micro-polarizer array to "bottom-out" onto the beads.

In one embodiment, a second sidelooking camera 17a is provided so that the distance between the PPA and the MFPA can be monitored as the PPA is brought into contact with the MFPA.

As the PPA and MFPA are brought into contact with one another, wicking of the epoxy into keep out zones occurs if the volume of the epoxy cannot be sufficiently controlled.

Figure 7:
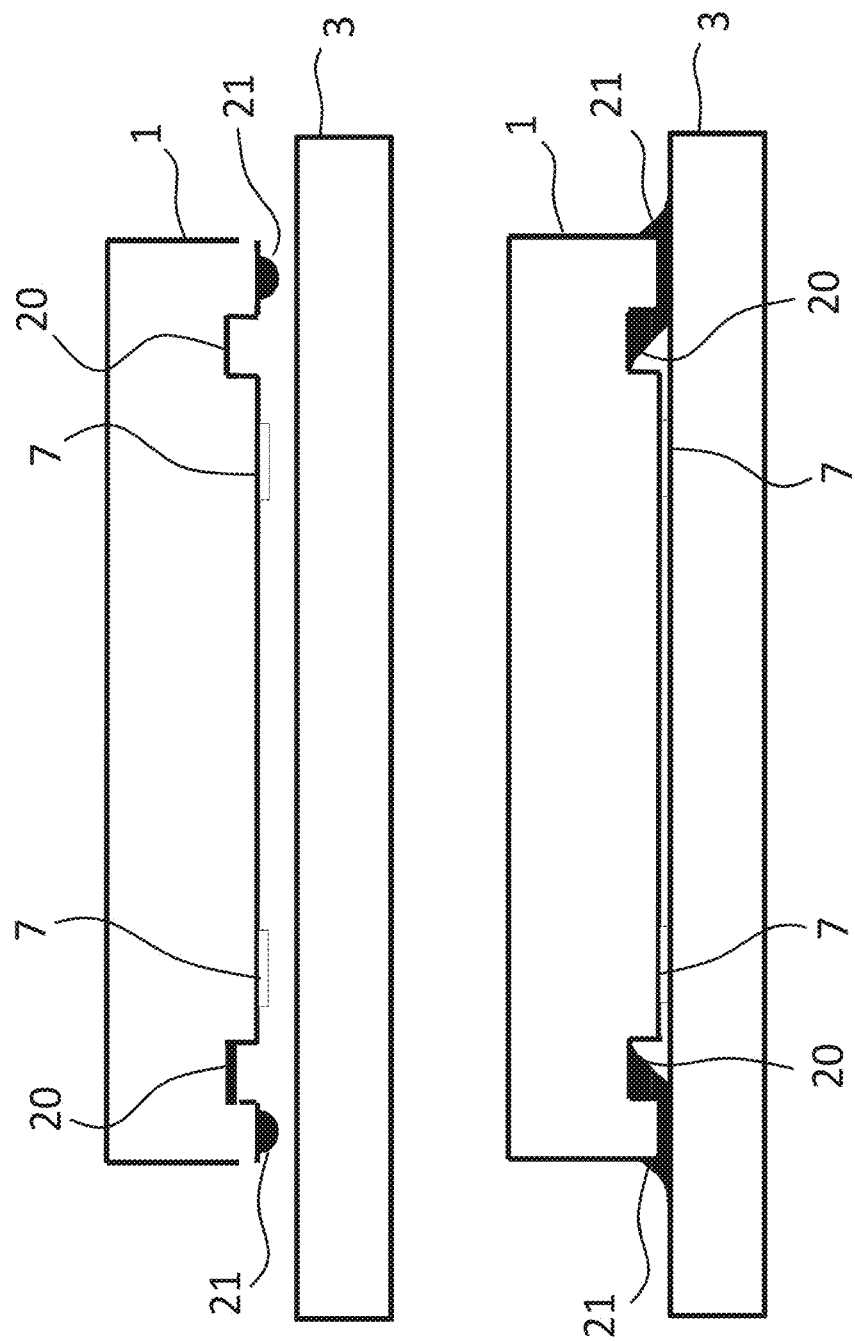
FIG. 7 is a block diagram of a side view of the PPA with trenches shown as cutouts near the edges of the PPA, depicting the PPA with epoxy in pre- and post-installed positions.
Figure 8:
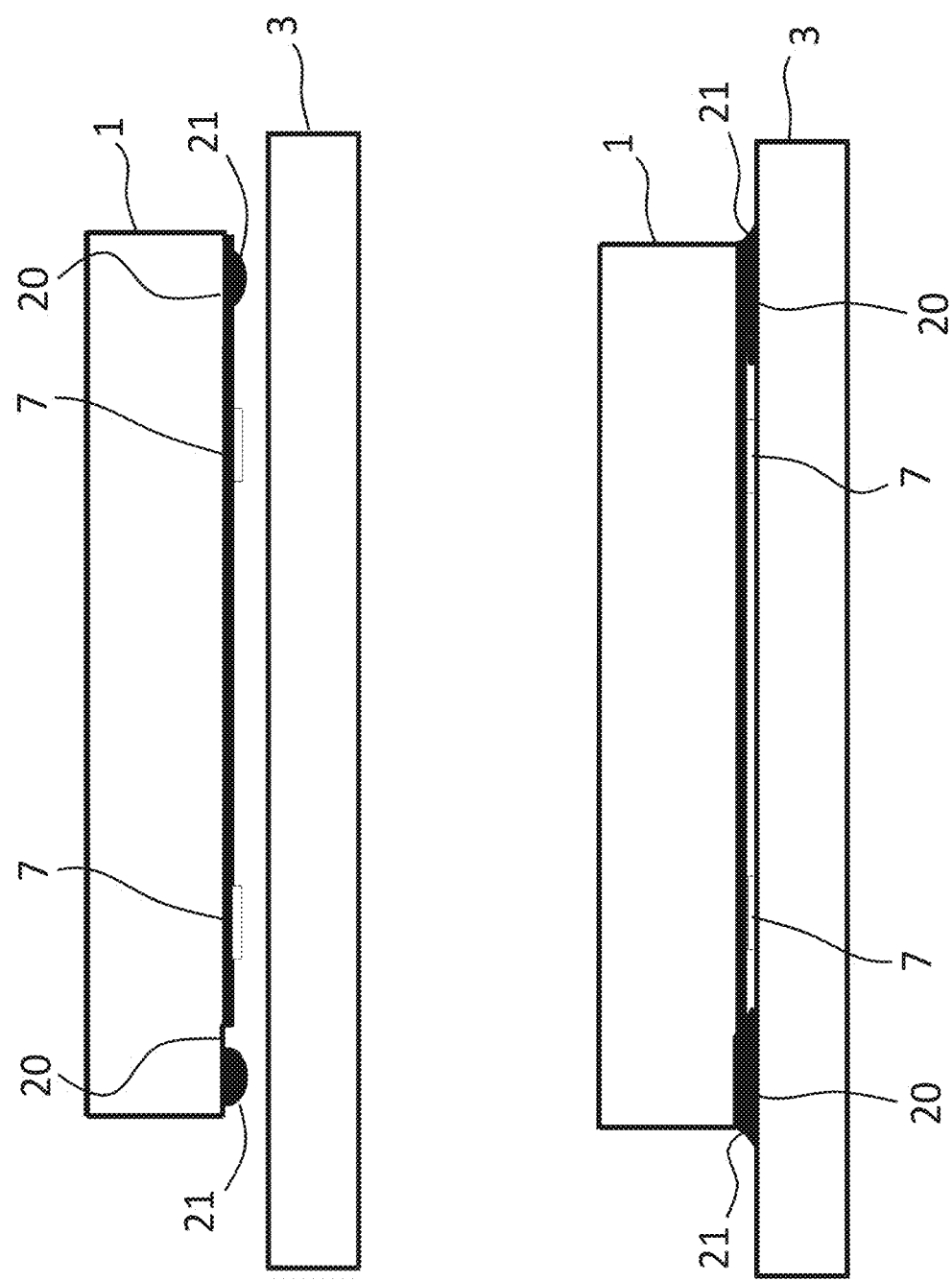
FIG. 8 is a block diagram of a side view of the PPA with trenches shown as cutouts on the edges of the PPA, depicting the PPA with epoxy in pre- and post-installed positions.

FIGS. 7 and 8 show two of the different methods that control the wicking process. The two figures show the PPA 1 above the MFPA 3 and after the PPA is landed onto the MFPA. In FIG. 7 a trench 20 has been cut near the outer edge of the PPA. The epoxy is deposited as a drop on the edge of the part. The epoxy 21 in FIGS. 7 and 8 is represented by solid black. When the sample is brought into contact, the epoxy wicks into the trench 20 and is stopped when the epoxy is depleted. The function of the trench is to provide a void for the epoxy to migrate so that it will not continue under the substrate into unwanted areas. FIG. 8 shows a similar approach in which a trench is cut along the outer edge of the PPA. Again, the function of the trench 20 on the outer edge is to deplete excess epoxy so that the wicking stops before entering keep out areas.

The Alignment Engine 8 must be modified if the PPA is opaque in the visible portion of the spectra. For example, if the PPA is made with a silicon substrate and AR coated to transmit in LWIR, the LWD 6 may seem impossible to implement since microscopy in the LWIR is not practical. However, the camera in use with the LWD can be a Short Wave Infrared camera (SWIR), a waveband in which microscopy is practical.

Figure 9:
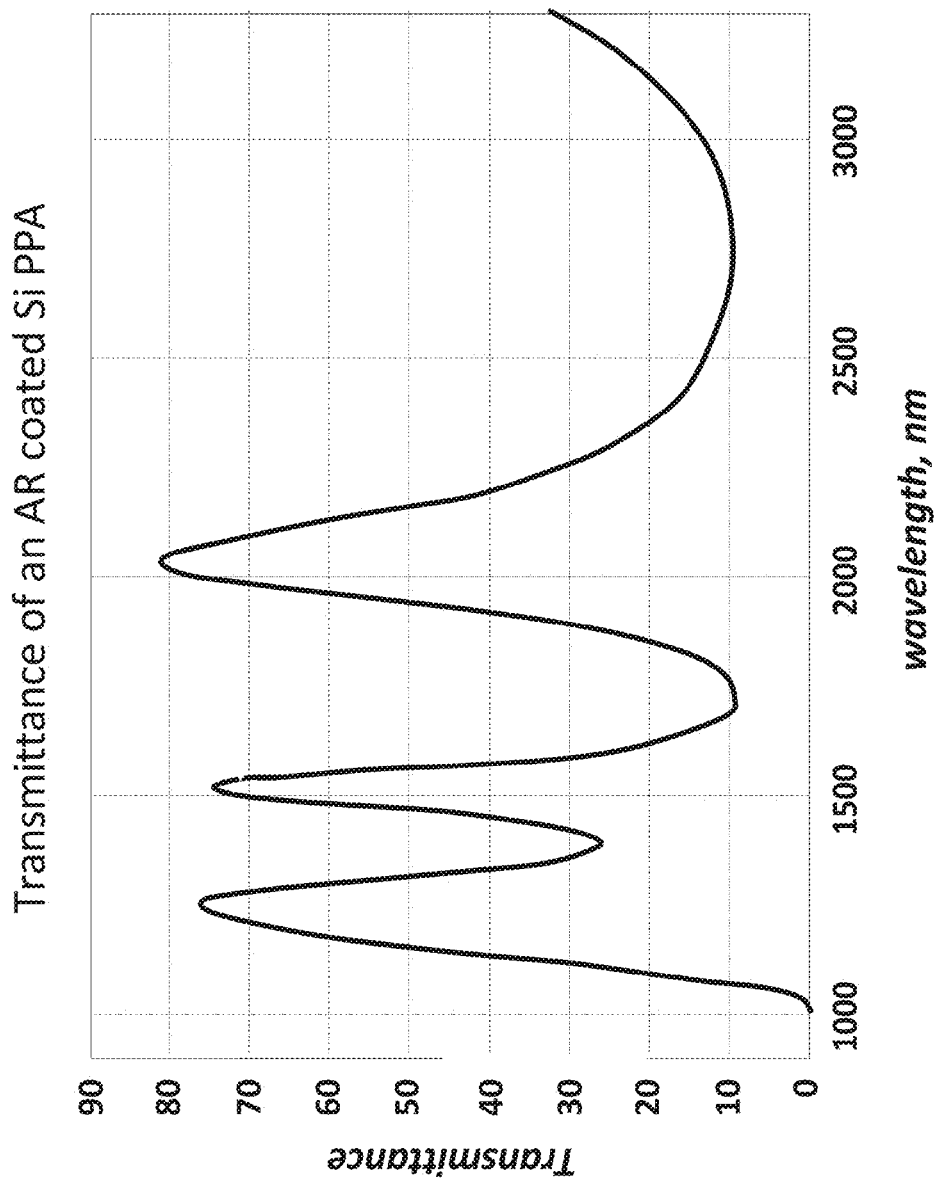
FIG. 9 is a graph showing short wave infrared (SWIR) pass-bands of a PPA designed for LWIR portion of spectra.

If a silicon or other material PPA is used that is opaque in the visible microscope, the alignment engine may be modified and still apply the techniques taught herein. FIG. 9 shows the transmission of a silicon PPA designed for maximum transmission in the LWIR. The transmission is zero in the visible portion of the spectra. However, at approximately 1250 nm and at 1505 nm there are transmission windows in the PPA that allow the SWIR microscope to image through the PPA.

The optics for the visible portion of the spectra will also work in the SWIR bands as long as a bandpass filter is used to limit the spectral range over which it will operate.

Limiting the spectral range is also necessary to minimize background reflected from the part outside of the spectral transmission band. Therefore with a change of camera (for example a Tau SWIR camera manufactured by FLIR, Inc) and including a bandpass filter centered on one of the SWIR passbands of the PPA, the Alignment Engine may be used in the same way as with a visible camera vision system.

Figure 10:
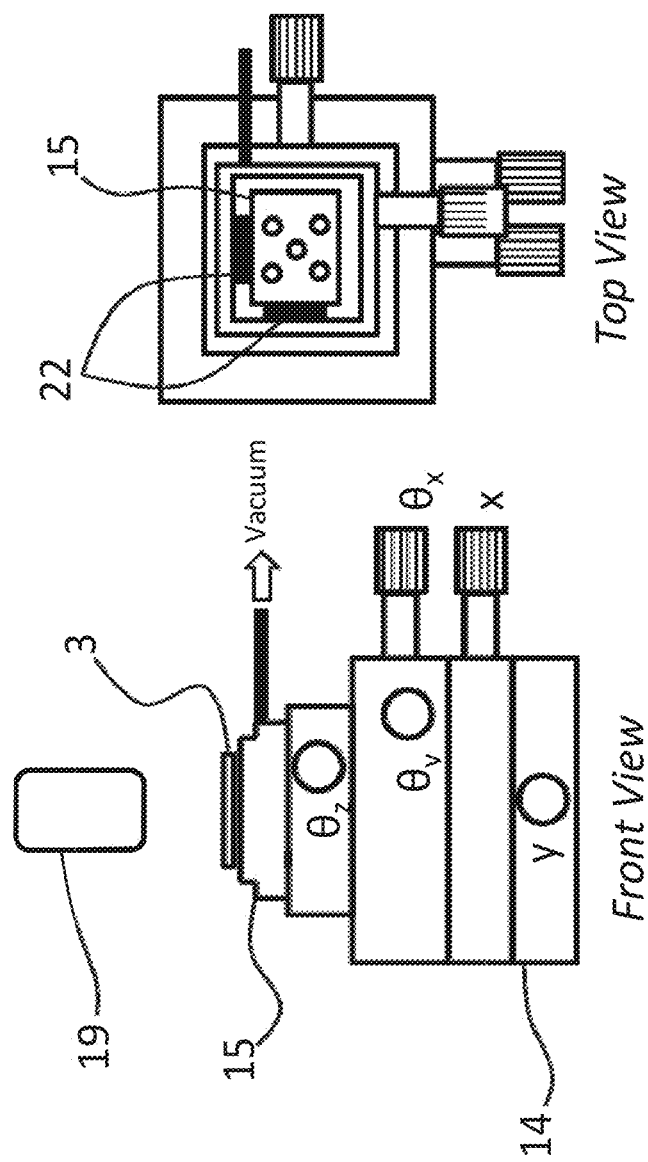
FIG. 10 shows front and top views of the MFPA chuck with the MFPA (right side) and without the MFPA (left side).

A novel vacuum chuck system is disclosed to hold both the PPA and the MFPA during attachment. A rotating platform allows for the PPA chuck 13 to be rotated 180° to allow more working space when applying the epoxy. FIG. 10 shows the MFPA chuck 15. The MFPA 3 is placed into the MFPA chuck by hand, pushing the package against locating stops 22. Then a vacuum pump is turned on to securely hold the MFPA in place during the attachment process. The MFPA chuck 15 is mounted to an X-Y-Z-tip-tilt combination stage in the MFPA chuck actuator 14 to allow for precise position and orientation.

Figure 11:
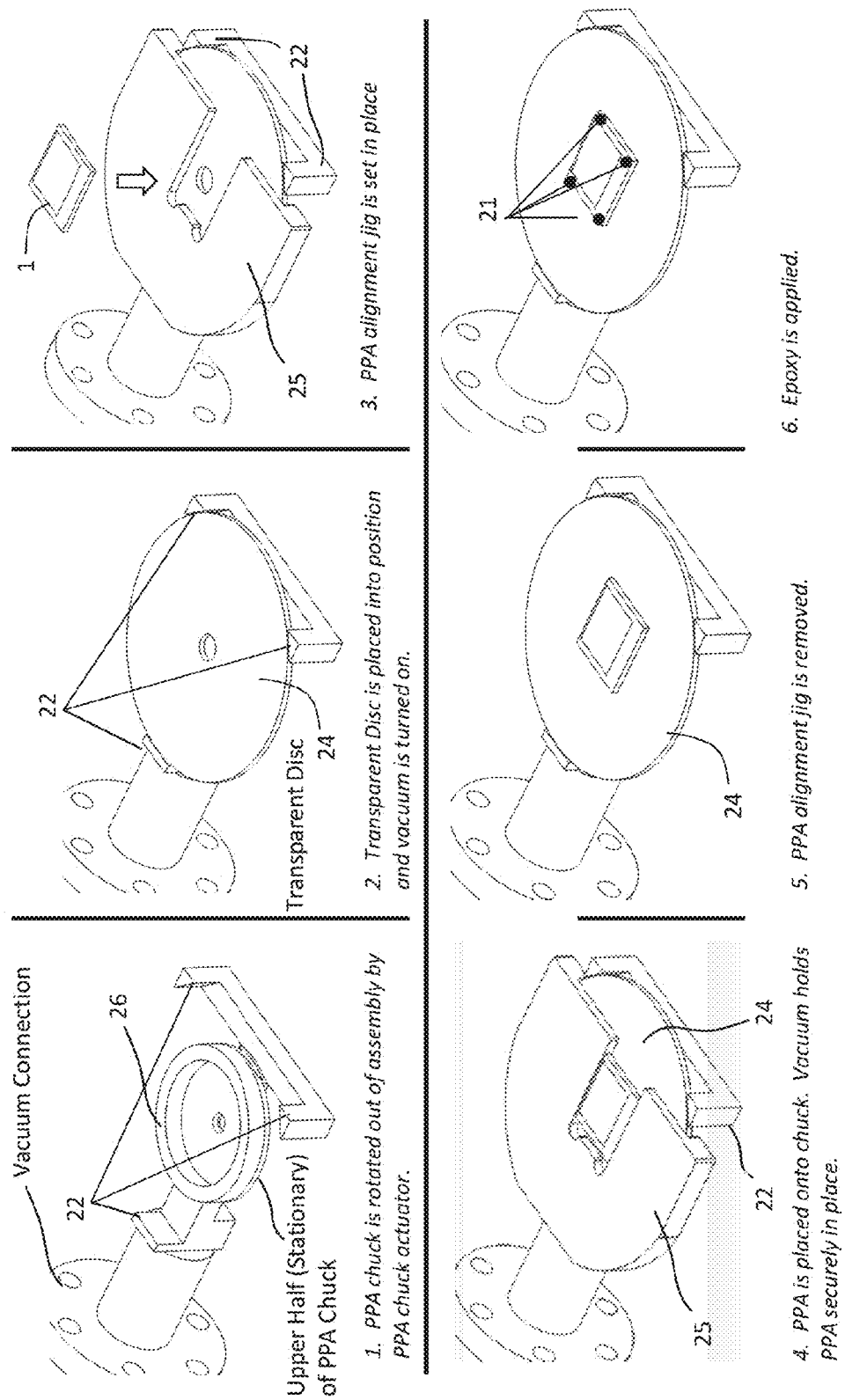
FIG. 11 shows the PPA chuck and PPA in the Epoxy Deposition Position in six steps.

The PPA chuck 13 is also designed specifically to hold the PPA by means of a vacuum. The PPA chuck comprises UV transparent, polished glass with holes drilled to provide the vacuum surface. The PPA chuck 13 is broken into an upper half 23 which is stationary and remains fixed to the vacuum arm and a transparent disc 24 is removable. A method for attaching the PPA to the PPA chuck is shown in great detail in FIG. 11. Once the epoxy has been applied to the PPA, the PPA chuck 13 is swung back into position by the PPA chuck actuator (see FIG. 6). The various adjustments on the PPA chuck and the MFPA chuck are used to precisely align the PPA to the MFPA as described herein. FIG. 11 details the following steps in the six numbered frames:

1. PPA chuck 13 is rotated out of assembly by the PPA chuck actuator 12.
2. Transparent disc 24 is placed into position and vacuum is turned on.
3. PPA alignment jig 25 is set in place
4. PPA 1 is placed onto PPA chuck 13. Vacuum holds PPA securely in place.
5. PPA alignment jig 25 is removed.
6. Epoxy is applied.

Figure 12:
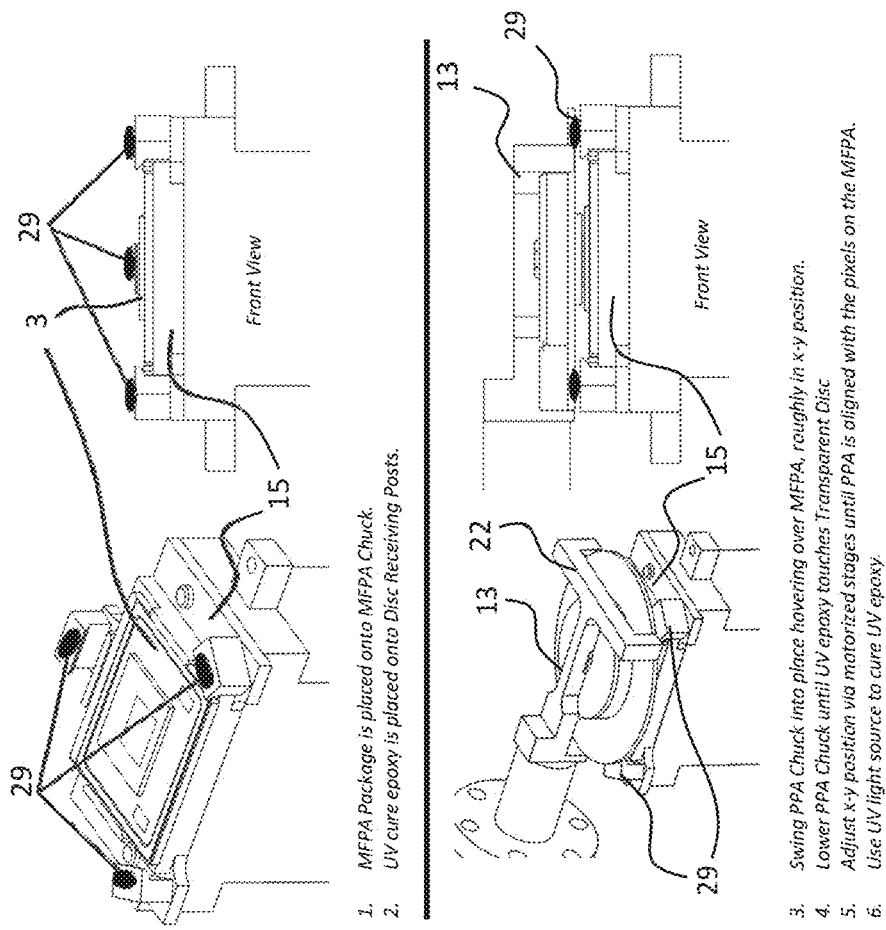
FIG. 12 shows the Alignment and Bonding Position in six steps using thermal only curing.

FIG. 12 shows a close-up view of the alignment procedure of the PPA and MFPA:
1. MFPA 3 is placed onto MFPA Chuck 15.
2. UV cure epoxy is placed onto disc receiving posts 29.
3. Swing PPA Chuck 13 into place hovering over MFPA 3, in approximate x-y position.
4. Lower PPA Chuck 13 until UV epoxy touches the transparent disc 24
5. Adjust x-y position within 2 microns via translation stages in MFPA chuck actuator 14 until PPA pixels 2 are aligned one-to-one with the corresponding MFPA pixels 4 and the PPA is at the desired height above the MFPA.
6. Use UV light source to cure UV epoxy.

Two bonding methods are detailed for attaching the PPA to the MFPA. The first utilizes a thermal cure epoxy to attach the PPA to the MFPA and the second method relies on a dual cure UV/thermal epoxy. The dual cure epoxy can be snap cured using a UV light source, but then can be placed into an oven to cure any areas of epoxy shadowed from the UV light.

In the first cure method, UV cure epoxy is applied to the disc receiving posts 29 on the MFPA chuck 15. This UV cure epoxy is only used during the alignment and curing of the thermal epoxy and does not remain in the system. The PPA is then brought down to close proximity using a Z-axis linear stage. Adjustments in X, Y, tip and tilt are then made accordingly to align the PPA to the MFPA within 2 microns in X and Y. The PPA is then brought down to touch the MFPA, and the epoxy is allowed to squeeze out. An elastomer gasket 26 allows for an amount of tip-tilt-Z compliance while still maintaining vacuum. The epoxy used to attach the PPA to the MFPA is a high strength, low outgassing, and elevated temperature cure epoxy. The UV cure epoxy placed on the disc receiving posts will also have made contact with the transparent disc 24 of the PPA chuck 13. At this point, a UV light source may be used to cure the UV cure epoxy; thereby rigidly attaching the transparent disc 24 to the MFPA chuck 15.

Once the UV epoxy is cured, the vacuum can be shut off. The PPA chuck 13 is moved up and swung clear of the assembly. At this point, the epoxy bonding the PPA to the MFPA is uncured; however, the UV cure epoxy holds the alignment. The PPA assembly is then moved into an oven to cure the epoxy. After the assembly has been baked at the proper temperature for the prescribed amount of time, the bonding pedestals are unscrewed from the MFPA vacuum chuck. The PPA/MFPA assembly is now complete.

Figure 13:
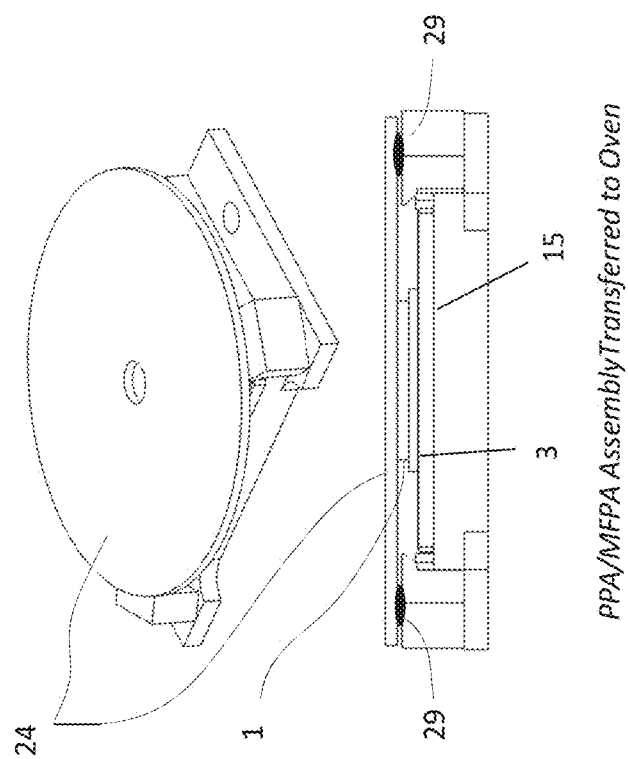
FIG. 13 shows the Alignment and Bonding Position using the thermal only curing, and the finished assembly.

FIG. 13 shows the assembly prior to being baked in the oven and once the assembly is complete.

Figure 14:
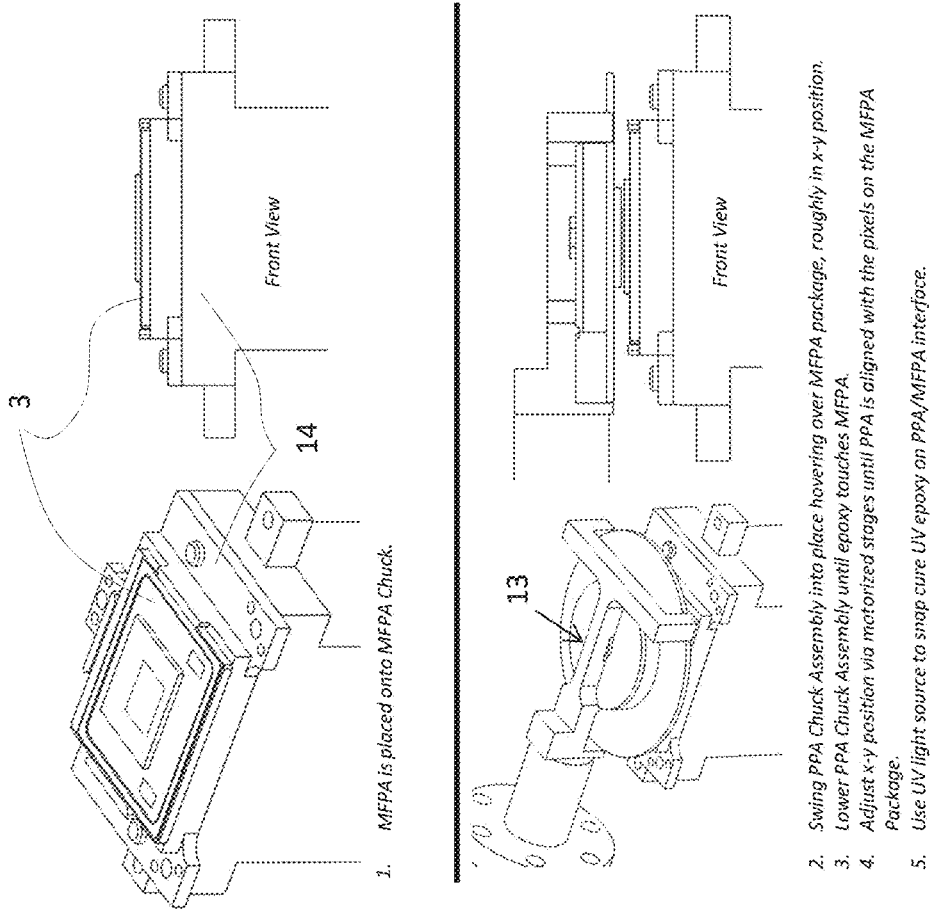
FIG. 14 shows the Alignment and Bonding Position using the dual cure UV/thermal epoxy in five steps.

The second bonding method utilizes a dual cure UV/thermal epoxy. This method allows for the epoxy to be snap cured, thereby tacking the PPA to the MFPA. This tack cure is sufficient to transport the PPA/MFPA assembly to the oven to cure the shadowed areas of epoxy. FIG. 14 shows the process for attaching the PPA to the MFPA using this bonding method.

1. MFPA is placed onto MFPA Chuck.
2. Swing PPA Chuck into place hovering over MFPA, roughly in x-y position.
3. Lower PPA Chuck until epoxy touches MFPA.
4. Adjust x-y position via motorized stages until PPA pixels are aligned with the pixels on the MFPA.
5. Use UV light source to snap cure UV epoxy on PPA/MFPA interface.

Figure 15:
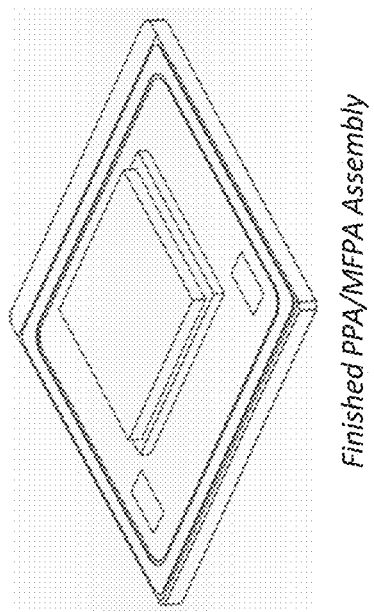
FIG. 15 is the finished PPA/MFPA assembly.

Again, the PPA is then brought down to close proximity using a Z-axis linear stage. The transparent disc 24 of the PPA chuck 13 is used to verify the position of the PPA hovering slightly above the MFPA. Adjustments in X, Y, tip and tilt are then made accordingly to align the PPA 1 to the MFPA 3 within 2 microns in X and Y. The PPA is then brought down to touch the MFPA, allowing the epoxy applied as shown to squeeze out. A high-intensity, UV light source is then used to tack the PPA to the MFPA. Once the epoxy is tacked, the vacuum is turned off on both chucks and the PPA chuck 13 is moved up and rotated clear of the final assembly of the PPA/MFPA 28 which is then transported to the oven and cured. The final assembly is seen in FIG. 15.

Two point or three point non-uniformity correction processes are effective procedures to remove fixed pattern noise in infrared detector arrays. These methods are well known in the literature and are routinely implemented. Depending on the type of sensor, however, there is typically a small amount of residual fixed pattern noise that is left after the non-uniformity correction. The residual fixed pattern noise often has some regular or symmetric pattern in the image.

Figure 16:
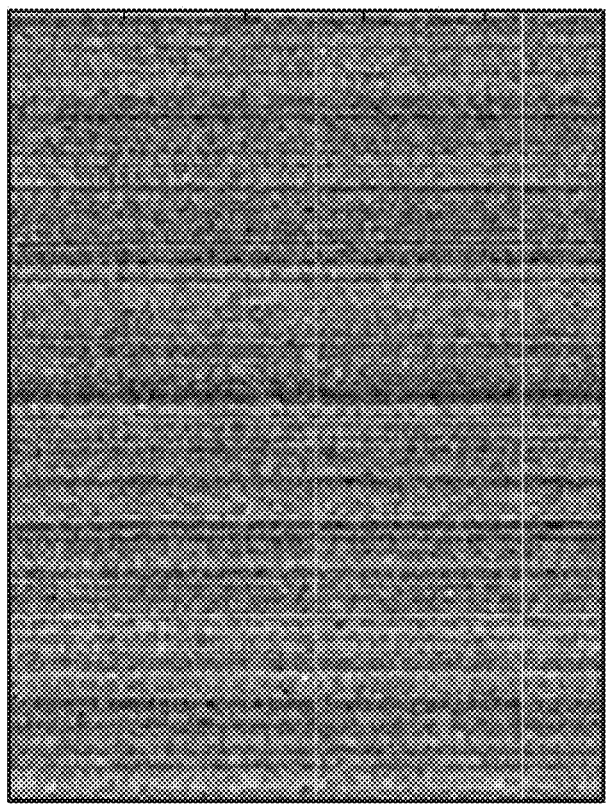
FIG. 16 is an image of a uniform black body source after a 2 point non-uniformity correction has been applied to the image.

FIG. 16 shows an example image taken with a commercial microbolometer of a uniform black body source after a 2 point non-uniformity correction has been applied to the image. Residual column wise fixed pattern is clearly seen across the image. This fixed pattern noise evolves slightly at a rate typically less than the frame rate and is thought to be a result of the read out electronics of the sensor, although the manufacturer will not disclose the exact source of the noise. In most applications, this residual noise is not noticeable in the image. The dynamic range or contrast in the image is too great to see the low level residual noise. For a polarimetric application multiple images, each with large contrast, are subtracted to observe small differences in polarization in the scene. The fixed pattern noise of the multiple images is weakly correlated, so it remains in the polarization image. If the fixed pattern noise is strongly correlated, it tends to be removed.

For column-wise noise as depicted in FIG. 16, a practice for building the LWIP is to organize the PPA as shown in FIG. 1, i.e., the horizontally polarized pixel (0 degrees) adjacent to the vertically polarized pixel (90 degrees) and the 45 degree polarized pixel adjacent to the 135 polarized pixel. When the pixels are oriented like this, the vertically correlated noise tends to be removed from the S1 image when the horizontally polarized image is subtracted from the vertically polarized image. Similarly, the vertically correlated noise is removed from the S2 image when the 45 degree polarized pixel is subtracted from the vertically polarized image.

Alternatively, a select number of pixel rows on the MFPA can be masked by making the corresponding pixels on the PPA opaque. With the rows of the MFPA blocked by the opaque pixels on the PPA, the MFPA will output the underlying column wise fixed pattern noise. The values along the row of pixels can be averaged column-wise to obtain the fixed pattern noise that is highly correlated to the fixed pattern noise along each row of the entire image. The residual fixed pattern noise W is therefore an array dimensioned 1×C, where C is the number of columns I the image. The residual correction factor is W'=W−(W) where (W) denotes the average of W.

Figure 17:
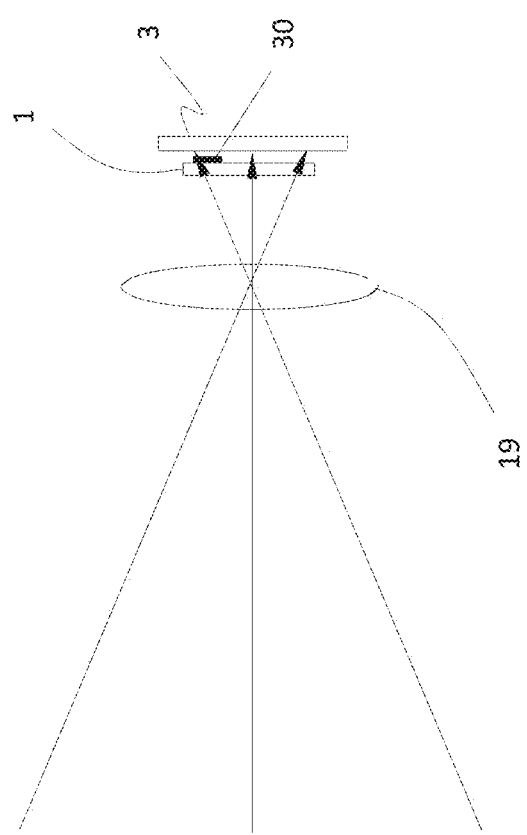
FIG. 17 shows the same image in FIG. 16 after correction using the polarization procedure described herein.

FIG. 17 shows a schematic of the setup, where an opaque element 30 is placed close on the PPA which may be absorptive or reflective. If the opaque element is absorptive, then the pixels under the element will detect the emission of the absorptive opaque element. If the opaque element is reflective, the pixels will detect their own self emission. In any case, the pixels will detect radiance that corresponds to the ambient temperature of the sensor. This uniform signature is needed to measure the underlying residual fixed pattern noise. The bad pixels in the pixels collected from the N rows of data are replaced with nearest neighboring good pixels. Several methods can be used to detect the bad pixels. For example the following procedure can be used. First, the mean value, M, and standard deviation, S, of the N lines of s1 or s2 image is calculated. Any pixel in the N line data set whose value, V, such that |V−M|>Q*S, is considered "bad". The remaining pixels (with values such that |V−M|<Q*S) are considered "good". A good rule of thumb for this method is for Q to have a value near 2 and N>=8.

Figure 18:
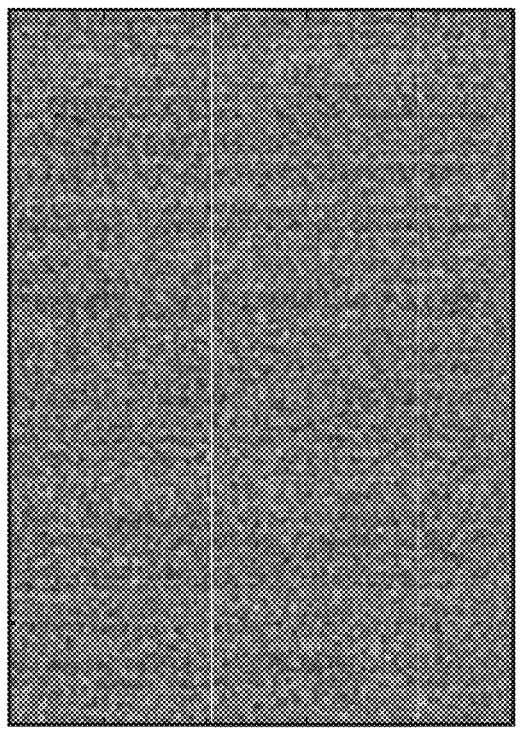
FIG. 18 is a schematic of the setup in which an opaque element is placed on a portion the PPA pixels.

FIG. 18 shows this correction applied to the image in FIG. 16. The correlated column-wise noise is significantly reduced so that the underlying uncorrelated white noise of the sensor is the dominant.

Covering the first N rows of pixels is particularly straight forward for the invention since a filter must be placed in front of the MFPA anyway. To implement this process, the first N rows are covered with gold (reflective element) to block the light from the scene from impinging on those rows. In this way those rows will only detect the residual fixed pattern noise. Although this method is optimal for the present invention since it already has a filter array in intimate contact with the MFPA, this method can be applied to any imager that has column-wise or row-wise residual fixed pattern noise.

We claim:

1. An LWIP comprising a PPA and an MFPA of equivalent pitches, the PPA comprising a first substrate and pixels for polarizing energy from a source, each said PPA pixel comprising a wire grid comprising wires laid directly on the first substrate and the MFPA comprising a second substrate and pixels comprising active areas, the PPA affixed to and parallel with the MFPA, and the PPA and the MFPA aligned so that the PPA pixels correspond one-to-one to the MFPA pixels and each of the PPA pixels transmits polarized energy to one of the MFPA pixels.

2. The LWIP as in claim 1, wherein the wires extend to edges of the PPA pixels.

3. The LWIP as in claim 2, wherein each of the wire grids has an orientation of 0, 45, 90 or 135 degrees.

4. The LWIP as in claim 1, the PPA further comprising an anti-reflective coating.

5. The LWIP as in claim 1, wherein the PPA pixels and the MFPA pixels are at a distance from one another not exceeding one half the pitch of the pixels.

6. The LWIP as in claim 1, wherein the active areas of the PPA pixels and the MFPA pixels have centers, and the PPA pixel centers and the MFPA pixel centers are within a range of +/−2 microns.

7. The LWIP as in claim 1, further comprising optics having an f/# of less than one.

8. The LWIP as in claim 1, wherein the LWIP is capable of functioning as a thermal only camera, as a polarizing camera only, or as a hybrid thermal and polarizing camera.

9. The LWIP as in claim 1, wherein the PPA further comprises beads affixed to a surface of the PPA facing the MFPA, said beads having a height not exceeding one half the pitch of the PPA pixels and the MFPA pixels.

10. An LWIP comprising a PPA and an MFPA of equivalent pitches approximately 17 microns or less, the PPA comprising a first substrate and pixels for polarizing electromagnetic radiation, each said PPA pixel comprising a wire grid comprising wires laid directly on the first substrate and the MFPA comprising a second substrate and pixels comprising active areas, the PPA affixed to and parallel with the MFPA, and the PPA and the MFPA aligned so that the PPA pixels correspond one-to-one to the MFPA pixels and each of the PPA pixels transmits polarized radiation to one of the corresponding MFPA pixels.

11. The LWIP as in claim 10, wherein the wires extend to edges of the PPA pixels.

12. The LWIP as in claim 10, wherein each of the wire grids has an orientation of 0, 45, 90 or 135 degrees.

13. The LWIP as in claim 10, the PPA further comprising an antireflective coating.

14. The LWIP as in claim 10, wherein the PPA pixels and the MFPA pixels are at a distance from one another not exceeding one half the pitch of the pixels.

15. The LWIP as in claim 10, wherein the active areas of the PPA pixels and the active areas of the MFPA pixels have centers, and the PPA pixel centers and the MFPA pixel centers are at a distance from one another aligned within a range of +/−2 microns.

16. The LWIP as in claim 10, further comprising optics having an f/# of less than one.

17. The LWIP as in claim 10, wherein the LWIP is capable of functioning as a thermal only camera, as a polarizing camera only, or as a hybrid thermal and polarizing camera.

18. The LWIP as in claim 10, wherein the PPA further comprises beads affixed to a surface of the PPA facing the MFPA, said beads having a height not exceeding one half the pitch of the PPA pixels and the MFPA pixels.

19. An LWIP comprising a PPA and an MFPA of equivalent pitches, the PPA comprising a first substrate and pixels for polarizing electromagnetic radiation in the spectral range of 7.5 to 13.5 microns, each said PPA pixel comprising a wire grid comprising wires laid directly on the first substrate and the MFPA comprising a second substrate and pixels comprising active areas, the PPA affixed to and parallel with the MFPA, and the PPA and the MFPA aligned so that the PPA pixels correspond one-to-one to the MFPA pixels and each of the PPA pixels transmits polarized radiation to one of the corresponding MFPA pixels.

20. The LWIP as in claim 19, wherein the wires extend to edges of the PPA pixels.

21. The LWIP as in claim 19, wherein each of the wire grids has an orientation of 0, 45, 90 or 135 degrees.

22. The LWIP as in claim 19, the PPA further comprising an antireflective coating.

23. The LWIP as in claim 19, wherein the PPA pixels and the MFPA pixels are at a distance from one another not exceeding one half the pitch of the pixels.

24. The LWIP as in claim 19, wherein the PPA pixels and the MFPA pixels have centers, and the PPA pixel centers and the MFPA pixel centers are aligned within a range of +/−2 microns.

25. The LWIP as in claim 19, further comprising optics having an f/# of less than one.

26. The LWIP as in claim 19, wherein the LWIP is capable of functioning as a thermal only camera, as a polarizing camera only, or as a hybrid thermal and polarizing camera.

27. The LWIP as in claim 19, wherein the PPA further comprises beads affixed to a surface of the PPA facing the MFPA, said beads having a height not exceeding one half the pitch of the PPA pixels and the MFPA pixels.

28. An LWIP comprising a PPA and an MFPA of equivalent pitches, the PPA and the MFPA separated by a distance not exceeding 8.5 microns, the PPA comprising a first substrate and pixels for polarizing energy from a source, each said PPA pixel comprising a wire grid comprising wires laid directly on the first substrate and the MFPA comprising a second substrate and pixels comprising active areas, the PPA affixed to and parallel with the MFPA, and the PPA and the MFPA aligned so that the PPA pixels correspond one-to-one to the MFPA pixels and each of the PPA pixels transmits polarized energy to one of the MFPA pixels.

29. The LWIP as in claim 28, wherein the wires extend to edges of the PPA pixels.

30. The LWIP as in claim 28, wherein each of the wire grids has an orientation of 0, 45, 90 or 135 degrees.

31. The LWIP as in claim 28, the PPA further comprising an antireflective coating.

32. The LWIP as in claim 28, wherein the PPA pixels and the MFPA pixels have centers, and the PPA pixel centers and the MFPA pixel centers are aligned within a range of +/−2 microns.

33. The LWIP as in claim 28, further comprising optics having an f/# of less than one.

34. The LWIP as in claim 28, wherein the LWIP is capable of functioning as a thermal only camera, as a polarizing camera only, or as a hybrid thermal and polarizing camera.

35. The LWIP as in claim 28, wherein the PPA further comprises beads affixed to a surface of the PPA facing the MFPA, said beads having a height not exceeding one half the pitch of the PPA pixels and the MFPA pixels.

* * * * *

UNITED STATES PATENT AND TRADEMARK OFFICE
CERTIFICATE OF CORRECTION

PATENT NO. : 9,829,384 B2
APPLICATION NO. : 14/854326
DATED : November 28, 2017
INVENTOR(S) : J. Larry Pezzaniti, Justin Parker Vaden and Michael Ernest Roche Page 1 of 1

It is certified that error appears in the above-identified patent and that said Letters Patent is hereby corrected as shown below:

In the Specification

Column 1, Line 17 (approx.), Please add the following paragraph following the STATEMENT CONCERNING PRIORITY STATEMENT AS TO FEDERALLY SPONSORED RESEARCH: This invention was made with Government support under W911QX-12-C-0008 awarded by Department of the Army. The Government has certain rights in the invention.

Signed and Sealed this
Twenty-first Day of April, 2020

Andrei Iancu
*Director of the United States Patent and Trademark Office*